Figure 2:
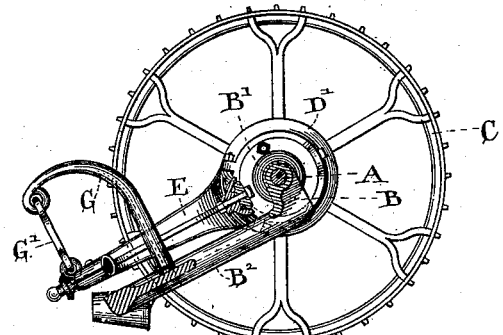

(Model.)

A. HURD.
HARVESTING MACHINE.

No. 256,434. Patented Apr. 11, 1882.

Witnesses:
Louis M. Whitehead.
W. H. Pearson Jr.

Inventor:
Asa Hurd
by George N. Aird
Atty.

UNITED STATES PATENT OFFICE.

ASA HURD, OF SPRINGFIELD, OHIO, ASSIGNOR TO WILLIAM N. WHITELEY, OF SAME PLACE.

HARVESTING-MACHINE.

SPECIFICATION forming part of Letters Patent No. 256,434, dated April 11, 1882.

Application filed March 22, 1880. (Model.)

*To all whom it may concern:*

Be it known that I, ASA HURD, of the city of Springfield, in the county of Clarke, in the State of Ohio, one of the United States of America, have invented certain new and useful Improvements in Harvesting-Machines, of which the following is a specification.

My invention relates to improvements on that class of harvesting-machines in which the sickle is operated by a vibrating arm from an oscillating gear-wheel which is mounted on the frame of machine and driven by a wheel attached to the master-wheel, or to the axle of the machine.

Heretofore differential gears, one of which oscillates upon a gimbal-joint giving motion to a vibrating arm and fly-wheel, have been used on harvesting-machines. The objection to the use of the gimbal-joint for this purpose is that the gimbal-joint, not being a true universal joint, will not give uniform motion. It is, further, complicated and expensive, and the joints are very liable to wear in use, causing the lower end of the vibrating arm to droop down in contact with the frame.

The object of my invention is to provide a method for using differential gear on harvesting-machines without the gimbal-joint and secure uniform motion, thereby simplifying and making more durable the mechanism for driving the knife. The gimbal-joint above referred to restrains the oscillating gear from the rotation with the main axle which the rotating gear tends to give it; but with the ball-and-socket joint it is required to furnish a support independent of the joint for that purpose and to prevent contact with the frame as the arm oscillates. This support is most conveniently applied to the vibrating arm at some convenient point between its free end and its connection with the oscillating gear.

In another application filed of even date herewith I have described and claimed a vibrating arm mounted upon a gimbal-joint and driven by an oscillating gear, and provided with a supporting-arm which re-enforces certain of the joint-pins and relieves them from side strain and unequal wear. I therefore do not herein claim a support in connection with a gimbal-joint.

My improvements consist of a ball-and-socket joint formed between the frame of the machine and the oscillating gear-wheel, to which the vibrating arm is connected for the purpose of permitting said gear-wheel to oscillate as required, in combination with a support connected to the frame of the machine for the purpose of sustaining the weight of the vibrating arm and preventing the rotation of the oscillating gear, while allowing the full reciprocation of said arm.

Figure 1:
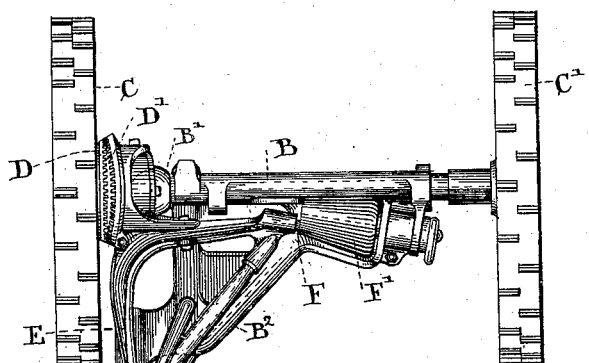
Figure 3:
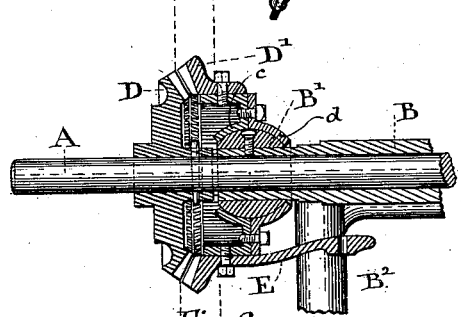
Figure 4:
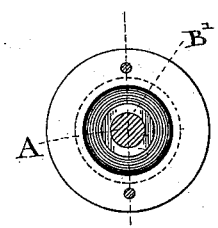
Figure 5:
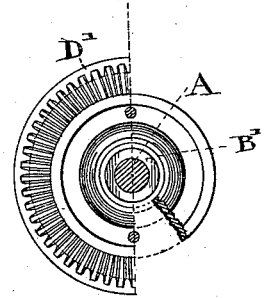

In the accompanying drawings, Figure 1 is a plan of a machine in which my improvements are embodied. Fig. 2 is a vertical longitudinal section of the same. Fig. 3 is a horizontal section of the ball-and-socket joint and differential gear, and Figs. 4 and 5 are details.

The general construction and design of the machine to which my improvements are applicable are substantially the same as illustrated in Patents No. 101,719 and 197,916, granted to Rudolf Eickemeyer, April 12, 1870, and William N. Whiteley, December 11, 1877, respectively, and need not therefore be described in detail, as I make no claim beyond the parts indicated in the above statement of invention.

A is the axle, B the frame, and C C' the driving and supporting wheels.

D D' are the differential oscillating gear-wheels, to the latter of which the vibrating arm E, which drives the sickle, is fastened.

On the frame B, at or about the position usually occupied by the gimbal-joint commonly used in this class of machine, a spherical bearing, B', is formed, on which bearing the hub of the gear-wheel D' is truly fitted in such manner that said wheel can freely rock or oscillate in any direction during the operation of the differential wheels. In order that the hub of the gear-wheel may be placed over and fitted upon the spherical bearing B', the wheel may be made in two sections which can be bolted together; or the hub may be divided, and when placed on the bearing may be fastened together in any suitable way. The vibrating arm may be connected to the wheel D', as shown in Figs. 1 and 3, or a sleeve may be provided on it which shall slip over the hub of the wheel.

F F' are the crank and fly wheels, respectively, which are connected to the vibrating arm in the usual way and control the movement of the oscillating wheel D'.

G is a bracket connected to the frame of machine, and, as shown in the drawings, located on the depending arm B² of the frame. This bracket forms a support for the end of the vibrating arm, to which it is connected by the sustaining-rod G', which rod, in the working of the machine, travels to and fro, at its lower end supporting the weight of the vibrating arm and preventing the rotation of the oscillating gear. The position and construction of this support for the vibrating arm may be changed to suit circumstances, as it need not necessarily be located on the arm B², although I prefer it in this position with a ball-and-socket joint. The office of this support is to uphold the end of the vibrating arm, which would otherwise (unlike the gimbal-joint) drop down, as the ball-and-socket joint has no sustaining power. The support and its sustaining-rod also govern the motion of the lower end of the vibrating arm, causing it to move in as nearly a horizontal line as possible while working.

I claim as my invention—

1. The combination of the rotating gear-wheel, the oscillating gear-wheel working on a ball-and-socket joint, the vibrating arm and connections, and the suspension-rod, said rod being sustained at one end by a support placed above and connected to the frame of machine and connected at the opposite end to the vibrating arm, substantially as and for the purpose described.

2. A gear which rotates with the main axle and in mesh therewith, an oscillating gear upon a ball-and-socket joint, and an arm for driving the knife fastened rigidly to said oscillating gear, combined with a support for said arm adapted to prevent rotation of said oscillating gear, but to permit free reciprocation of said arm.

ASA HURD.

Witnesses:
AUG. N. SUMMERS,
PERCY NORTON.